(12) United States Patent
Charlson et al.

(10) Patent No.: US 7,980,602 B2
(45) Date of Patent: Jul. 19, 2011

(54) FITTING TO CONNECT A POLYVINYL CHLORIDE PIPE AND A POLYETHYLENE PIPE

(75) Inventors: Charles Charlson, Rogers, MN (US); Gregory Charleson, Saint Anthony, MN (US)

(73) Assignee: Poly-Cam, Inc., Anoka, MN (US)

( * ) Notice: Subject to any disclaimer, the term of this patent is extended or adjusted under 35 U.S.C. 154(b) by 147 days.

(21) Appl. No.: 12/233,310

(22) Filed: Sep. 18, 2008

(65) Prior Publication Data
US 2010/0066081 A1    Mar. 18, 2010

(51) Int. Cl.
*F16L 13/14* (2006.01)
(52) U.S. Cl. ......... 285/382; 285/330; 285/390; 285/423
(58) Field of Classification Search ............ 285/242, 285/382, 382.7, 330, 400, 256, 423, 333, 285/355, 390, 381.2, 381.3, 381.4, 381.5
See application file for complete search history.

(56) References Cited

U.S. PATENT DOCUMENTS

| | | | |
|---|---|---|---|
| 2,766,054 A * | 10/1956 | Everhart | ............ 285/230 |
| 3,468,346 A | 9/1969 | Onifer | |
| 3,900,220 A * | 8/1975 | Buchser | ............ 285/148.23 |
| 3,904,228 A | 9/1975 | Maroschak | |
| 3,989,787 A | 11/1976 | Scott | |
| 4,504,086 A | 3/1985 | Carrow | |
| 4,708,374 A | 11/1987 | Cox | |
| 5,286,001 A | 2/1994 | Rafeld | |
| 5,336,351 A | 8/1994 | Meyers | |
| 5,366,257 A | 11/1994 | McPherson | |
| 5,437,481 A * | 8/1995 | Spears et al. | ............ 285/148.13 |
| 5,582,439 A | 12/1996 | Spears | |
| 5,678,865 A | 10/1997 | Anderson | |
| 5,769,128 A * | 6/1998 | Auvil et al. | ............ 138/143 |
| 6,000,436 A | 12/1999 | Auvil | |
| 6,089,615 A * | 7/2000 | Jappinen | ............ 285/21.2 |
| 6,450,543 B1 | 9/2002 | Fukano | |
| 6,540,261 B1 | 4/2003 | Painter | |
| D549,804 S | 8/2007 | Lewis | |
| 2002/0096880 A1 | 7/2002 | Schulz | |
| 2007/0236010 A1 | 10/2007 | Campau | |

OTHER PUBLICATIONS

Combination Reducing Tee Insert × Insert × Fipt 1 ¼× 1 ¼× 1, www.sprinklerwarehouse.com, Copyright © 2006, 3 pages.
PVC and Schedule 40 Female Adapters, www.doityourself.com/icat/sched40andpvcfemale, retrieved Sep. 18, 2008, 3 pages.

* cited by examiner

*Primary Examiner* — David E Bochna
(74) *Attorney, Agent, or Firm* — Merchant & Gould P.C.

(57) ABSTRACT

A pipe fitting facilitates joining of a high-density polyethylene (HDPE) pipe to a polyvinyl chloride (PVC) pipe. The fitting has a HDPE body. A ring-shaped PVC insert is positioned within an inner surface of the body at one opening of the body. An inner surface of the PVC insert is threaded so that a PVC pipe that has a threaded outer surface can be screwed into the PVC insert. A compression ring is installed over the outer surface of a portion of the body that surrounds the PVC insert. Prior to installation, the inner diameter of the compression ring is smaller than the outer diameter of the portion of the body that surrounds the PVC insert. For this reason, when the compression ring is installed, the compression ring compresses the portion of the body that surrounds the PVC insert, holding the PVC insert within the body.

8 Claims, 5 Drawing Sheets

US 7,980,602 B2

FITTING TO CONNECT A POLYVINYL CHLORIDE PIPE AND A POLYETHYLENE PIPE

BACKGROUND

Pipes made of Polyvinyl Chloride (PVC) are used in a wide variety of settings. For instance, PVC pipes are frequently used in irrigation systems for lawns and golf courses. Pipes made of high-density polyethylene (HDPE) may be used in similar settings. Because of their use in similar settings, situations arise in which there is a need to connect PVC pipes to HDPE pipes. However, due to the characteristics of HDPE and PVC, HDPE pipes cannot easily be chemically welded to PVC pipes. Furthermore, manufacturers of HDPE pipes generally recommend against using threaded connections on HDPE pipes. Moreover, threaded joints between HDPE pipes and PVC pipes tend to exhibit poor pressure resistance. In other words, a HDPE pipe and a PVC pipe connected with a threaded joint tend to separate when internal pressure is too high.

In accordance with one solution to this problem, a cylindrical metal insert is forced into a neck of an HDPE pipe. As the metal insert is forced into the neck of the HDPE pipe, the metal insert exerts outward radial force. Reciprocally, the neck of the HDPE pipe exerts inward radial force on the metal insert. The inward radial force keeps the metal insert from moving relative to the neck of the HDPE pipe after the metal insert is installed. The inner surface of the metal insert is threaded such that a PVC pipe can be threaded into the metal insert.

SUMMARY

In general, this disclosure is directed to a pipe fitting. The fitting has a high-density polyethylene (HDPE) body. A ring-shaped polyvinyl chloride (PVC) insert is positioned within an inner surface of the body at one opening of the body. An inner surface of the PVC insert is threaded so that a PVC pipe that has a threaded outer surface can be screwed into the PVC insert. A compression ring is installed over the outer surface of a portion of the body that surrounds the PVC insert. Prior to installation, the inner diameter of the compression ring is slightly smaller than the outer diameter of the portion of the body that surrounds the PVC insert. For this reason, when the compression ring is installed, the compression ring compresses the portion of the body that surrounds the PVC insert. Because the portion of the body that surrounds the PVC insert is compressed, the portion of the body exerts inward radial force on the PVC insert. This force creates friction that holds the PVC insert within the body.

In some instances, the pipe fitting described in this disclosure may overcome one or more issues with the existing pipe fittings for attaching PVC pipes to HDPE pipes. For instance, the metal insert described above may be relatively expensive to manufacture as compared to the PVC insert used in the pipe fitting of this disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In general, this disclosure discusses a pipe fitting that connects a high-density polyethylene (HDPE) pipe to a polyvinyl chloride (PVC) pipe and processes for manufacturing and using such a pipe fitting. The following detailed description describes the pipe fitting and the processes in terms of examples. It should be appreciated that these examples are provided for purposes of explanation and should not be understood to be necessary limitations on the scope of the claims.

Figure 1:
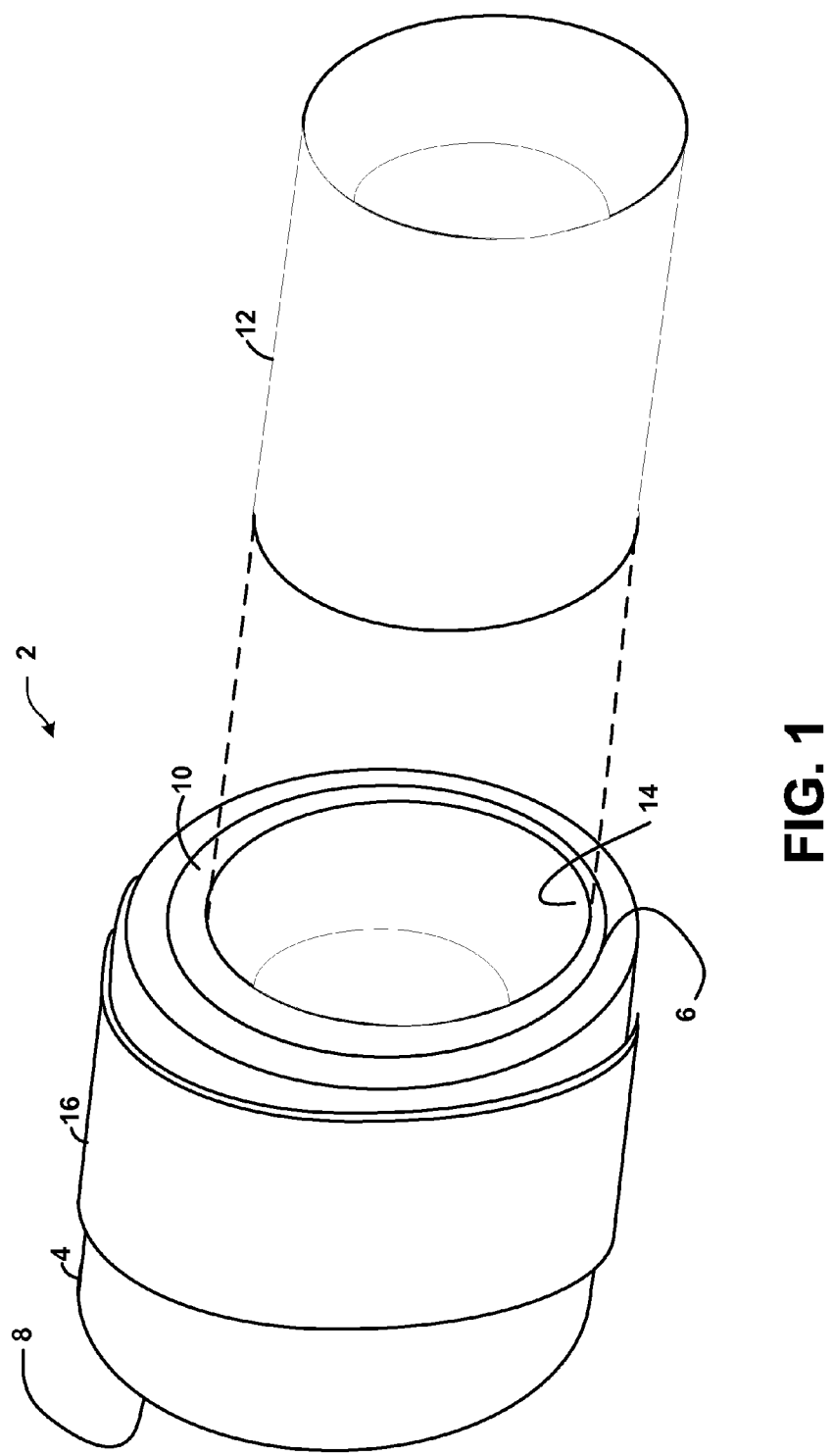
FIG. 1 illustrates an example pipe fitting that realizes the techniques of this disclosure.

FIG. 1 illustrates an example pipe fitting 2 that realizes the techniques of this disclosure. As illustrated in the example of FIG. 1, the pipe fitting 2 comprises a HDPE body 4. The HDPE body 4 may be made of one or more different types of HDPE. For example, the HDPE body 4 may be made of HDPE 3408. In the example of FIG. 1, the HDPE body 4 includes two circular openings, marked 6 and 8.

Furthermore, the pipe fitting 2 comprises a cylindrical PVC insert 10 positioned within an opening 6 of the HDPE body 4. In one instance, the outer diameter of the PVC insert 10 is, prior to installation in pipe fitting 2, approximately the same as the inner diameter of the HDPE body 4. In a second instance, the outer diameter of the PVC insert 10 is smaller than the inner diameter of the HDPE body 4 such that the outer surface of the PVC insert 10 does not contact the inner surface of the HDPE body 4. In this second instance, the insert 10 may have a flange extending from an exterior end of the PVC insert 10. This flange may prevent the insert 10 from falling completely within the HDPE body 4.

The PVC insert 10 is designed to accommodate a PVC pipe 12. The PVC insert 10 may be made of one or more different types of PVC. For example, the PVC insert 10 may be made of schedule 80 PVC, schedule 80 chlorinated PVC, schedule 40 PVC, fusible PVC, or another type of PVC.

An interior surface 14 of the PVC insert 10 is threaded. The interior surface 14 may be threaded in a variety of ways. For instance, the interior surface 14 of the PVC insert 10 may be threaded with an Acme-type thread or another type of thread. The threading on the interior surface 14 is designed to enable the PVC pipe 12 to be screwed into the PVC insert 10 such that the exterior surface of the PVC pipe 12 is within the interior surface 14 of the PVC insert 10.

A ring-shaped compression ring 16 is installed over the outer surface of the HDPE body 4. The compression ring 16 is gapless and is not creased or crimped. The compression ring 16 may be made of a variety of materials. For example, the compression ring 16 may be made of grade 316 stainless steel or another type of metal or metal alloy. In another example, compression ring 16 may be made of PVC. The interior diameter of the compression ring 16 is smaller than the outer diameter of the HDPE body 4 prior to installation of the compression ring 16. Consequently, when the compression ring 16 is installed over the outer surface of the HDPE body 4, the compression ring 16 exerts inward radial force on the HDPE body 4. The inward radial force exerted by the compression ring 16 compresses the HDPE body 4 inward, reducing the inner diameter and the outer diameter of the HDPE body 4. Because the HDPE body 4 is compressed inward, the inner surface of the HDPE body 4 exerts inward radial force on the PVC insert 10. The inward radial force exerted by the HDPE body 4 on the PVC insert 10 creates a tight fit between the HDPE body 4 and the PVC insert 10. This tight fit prevents the PVC insert 10 from moving relative to the HDPE body 4 after the compression ring 16 is installed over the outer surface of the HDPE body 4.

Figure 2:
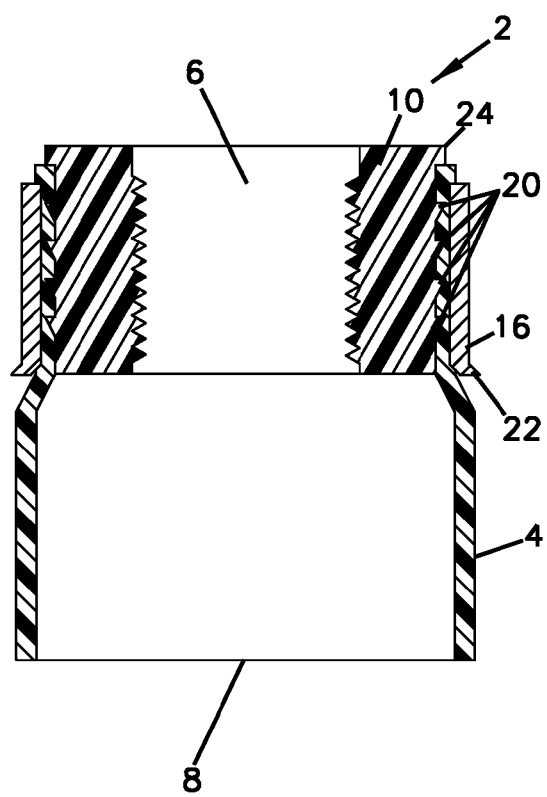
FIG. 2 illustrates a cross-section view of the example pipe fitting illustrated in FIG. 1.

FIG. 2 illustrates a cross-section view of the example pipe fitting 2 illustrated in FIG. 1. As illustrated in the example of FIG. 2, a set of annular barbs 20 extend from the outer surface of the PVC insert 10. The barbs 20 extend outward from outer surface of the PVC insert 10 around the entire diameter of the PVC insert 10. When the compression ring 16 is installed over the outer surface of the HDPE body 4, the inner surface of the HDPE body 4 compresses inward onto the outer surface of the PVC insert 10 and the barbs 20. As the inner surface of the HDPE body 4 compresses inward onto the barbs 20, the inner surface of the HDPE body 4 deforms around barbs 20, forming a tight seal that further increases the force necessary to move the PVC insert 10 relative to the HDPE body 4. Prior to installation of the compression ring 16, the inner surface of the HDPE body 4 does not include indentations to accommodate the barbs 20. However, when the compression ring 16 is installed and the inner surface of the HDPE body 4 deforms around the barbs 20, the inner surface of the HDPE body 4 indents such that each of the barbs 20 is fully embedded within the HDPE body 4.

In the example of FIG. 2, the barbs 20 have exterior edges that form perpendicular angles to the outer surface of the PVC insert 10. In addition, the barbs 20 have interior edges that are angled at approximately 30 degrees relative to the outer surface of the PVC insert 10. It should be appreciated that in other versions of the pipe fitting 2, the interior edges of the barbs 20 may have be angled at a variety of different degrees relative to the outer surface of the PVC insert 10. For instance, the exterior edges of the barbs 20 may be angled at a non-right angle relative to the outer surface of the PVC insert 10.

In the example of FIG. 2, there are four barbs. It should be appreciated that other versions of the pipe fitting 2 may have alternate numbers of barbs. For example, alternate versions of the pipe fitting 2, one to ten barbs may extend from the outer surface of the PVC insert 10.

Furthermore, in the example of FIG. 2, all of the barbs 20 are the same size and shape. It should be appreciated that in other versions of the pipe fitting 2, one or more barbs extending from the outer surface of the PVC insert 10 may have different sizes and shapes than other barbs extending from the outer surface of the PVC insert 10.

The example of FIG. 2 also illustrates that an interior edge 22 of the compression ring 16 may be angled outward. The outward angle of the interior edge 22 may enable the compression ring 16 to be installed more easily over the outer surface of the HDPE body 4.

In addition, the example of FIG. 2 illustrates that the PVC insert 10 may have an annular flange 24 that extends outward from the exterior end of the PVC insert 10. Flange 24 may act to prevent the PVC insert 10 from moving further into the HDPE body 4 when the compression ring 16 is installed.

Figure 3:
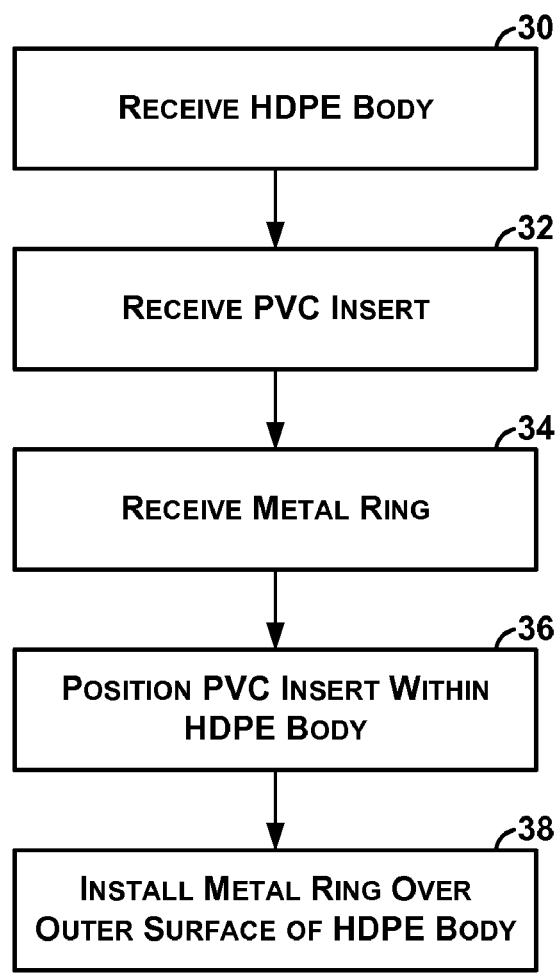
FIG. 3 illustrates an example process of manufacturing the example pipe fitting illustrated in FIG. 1.

FIG. 3 illustrates an example process of manufacturing the example pipe fitting 2 illustrated in FIG. 1. This example manufacturing process begins by receiving the HDPE body 4 in an assembly area (30). For example, this example manufacturing process may begin by receiving the HDPE body 4 in a press. Next, the PVC insert 10 is received in the assembly area (32). The compression ring 16 is also received in the assembly area (34).

After at least the HDPE body 4 and the PVC insert 10 are received in the assembly area, the PVC insert 10 is positioned within the opening 8 of the HDPE body 4 (36). Because, at this point in the assembly process of the pipe fitting 2, the compression ring 16 has not yet been installed, the outer diameter of the PVC insert 10, including the barbs 20, is slightly smaller than the inner diameter of the HDPE body 4. Consequently, the PVC insert 10 may be positioned within the opening of the HDPE body 4 without the exertion of great force.

After the PVC insert 10 is positioned within the opening 8 of the HDPE body 4, the compression ring 16 is installed over the outer surface of the HDPE body 4 at the opening 8 (38). In one example installation technique, a press is used to force the compression ring 16 directly over the outer surface of the HDPE body 4. As discussed above, prior to installation of the compression ring 16 over the outer surface of the HDPE body 4, an outer diameter of the PVC insert 10 is approximately equal to an inner diameter of the opening 8 of the HDPE body 4. Furthermore, prior to installation of the compression ring 16 over the outer surface of the HDPE body 4, an inner diameter of the compression ring 16 is less than an outer diameter of outer surface of the HDPE pipe body 4 at the opening 8. After installation of the compression ring 16 over the outer surface of the HDPE body 4, the outer diameter of the outer surface of the HDPE body 4 is approximately equal to the inner diameter of the compression ring 16. Furthermore, the inner diameter of the compression ring 16 after installation of the compression ring 16 is substantially the same as the inner diameter of the compression ring 16 prior to installation of the compression ring 16.

Figure 4:
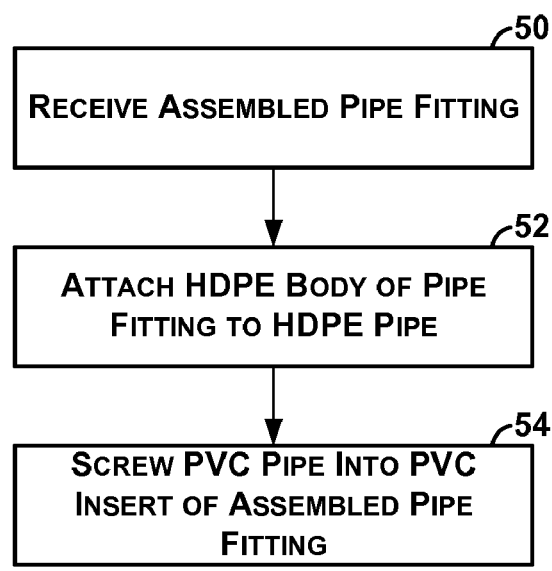
FIG. 4 illustrates an example process of using the example pipe fitting illustrated in FIG. 1.

FIG. 4 illustrates an example process of using the example pipe fitting 2 illustrated in FIG. 1. This example process begins when the assembled pipe fitting 2 is received by a user (50). For instance, the user may receive the assembled pipe fitting 2 in at a factory or at a field location.

After receiving the assembled pipe fitting 2, the user attaches a HDPE pipe to opening 8 of the HDPE body 4 (52). The user may attach the HDPE pipe to the opening 8 of the HDPE body 4 in a variety of ways. For example, the user may chemically weld or fuse the HDPE pipe to the opening 8 of the HDPE body 4.

Next, the user screws the PVC pipe 12 into the PVC insert 10 of the assembled pipe fitting 2 (54). The user may screw the PVC pipe 12 into the PVC insert 10 by rotating the PVC pipe 12 or the assembled pipe fitting 2, as appropriate. Depending on a variety of factors, the user may screw the PVC pipe 12 into the PVC insert 10 by hand or using a machine.

Figure 5:
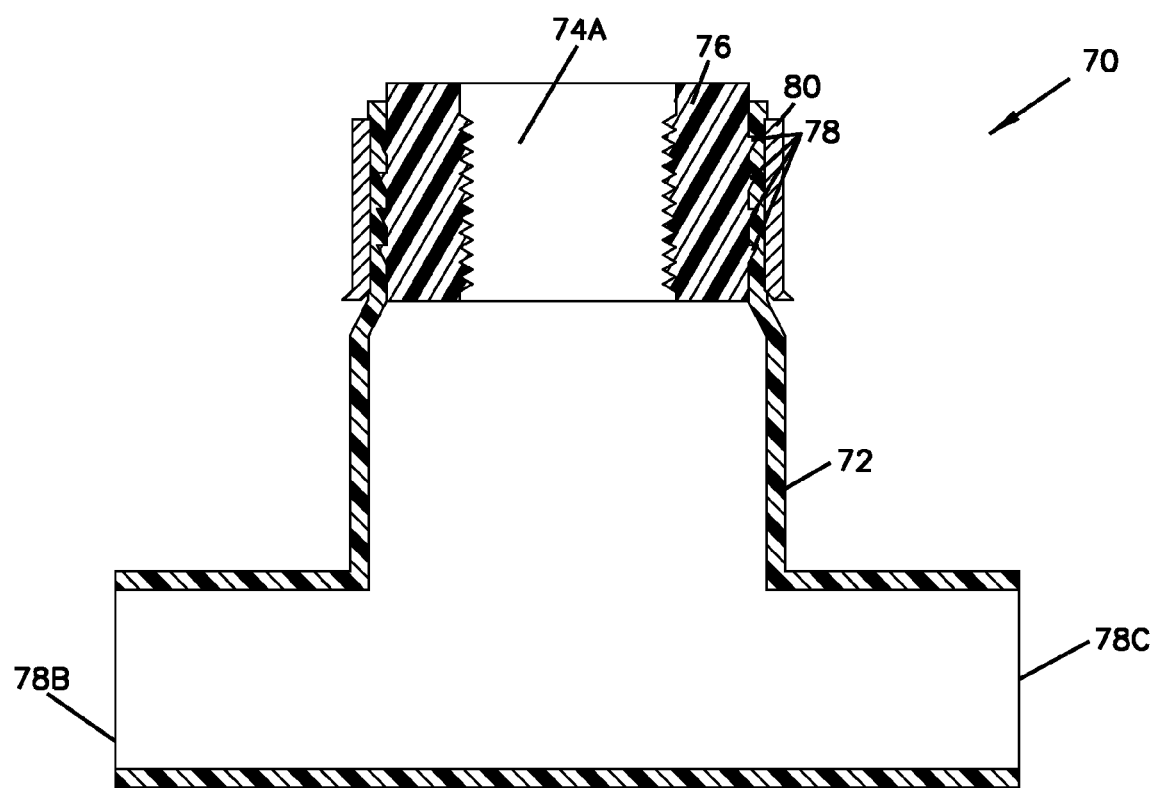
FIG. 5 illustrates a cross-section of an example tee fitting that realizes the techniques of this disclosure.

FIG. 5 illustrates a cross-section of an example assembled tee fitting 70 that realizes the techniques of this disclosure. As can be seen in the example of FIG. 5, tee fitting 70 includes a tee-shaped HDPE body 72. HDPE body 72 has three openings, marked 74A, 74B, and 74C.

Tee fitting 70 includes a threaded PVC insert 76 that is similar to the PVC insert 10 shown in the examples of FIG. 1 and FIG. 2. Like the barbs 20 shown in the example of FIG. 2, barbs 78 extend outward from the outer surface of the PVC insert 72 and serve similar functions. Tee fitting 70 also includes a compression ring 80 that functions in a similar way as the compression ring 16 illustrated in the examples of FIG. 1 and FIG. 2. HDPE pipes can be attached to openings 78A and 78B.

Although FIG. 5 illustrates an assemble tee fitting, it should be appreciated that the techniques of this disclosure may be realized on other types of pipe fittings. For example, the techniques of this disclosure may be realized on elbow joints, branch saddles, and other types of pipe fittings.

The techniques of this disclosure may be realized in several ways. For example, the techniques of this disclosure may be realized as a pipe fitting comprising a HDPE pipe body having a circular opening. The pipe fitting also comprises a ring-shaped PVC insert positioned within the opening such that an outer surface of the PVC insert is in contact with an inner surface of the opening of the HDPE pipe body. An inner surface of the PVC insert is threaded. In addition, the pipe fitting comprises a gapless compression ring installed over an outer surface of the HDPE pipe body at the opening of the HDPE pipe body such that the compression ring exerts inward radial force on the HDPE pipe body, compressing the HDPE pipe body inward such that the inner surface of the opening of the HDPE pipe body exerts inward radial force on the outer surface of the PVC insert, thereby creating a tight fit between the HDPE pipe body and the PVC insert.

In another example, the techniques of this disclosure may be realized as a process of assembling a pipe fitting for joining a HDPE pipe and a PVC pipe. This process comprises receiving a HDPE pipe body having a circular opening. The process also comprises receiving a ring-shaped PVC insert designed to accommodate the PVC pipe, the PVC insert having an inner surface that is threaded. In addition, the process comprises receiving a gapless compression ring that has an inner diameter that is smaller than an outer diameter of the HDPE pipe body at the opening of the HDPE pipe body. Furthermore, the process comprises positioning the PVC insert within the opening of the HDPE pipe body such that an outer surface of the PVC insert is in contact with an inner surface of the opening of the HDPE pipe body. The process also comprises installing the compression ring over an outer surface of the HDPE pipe body at the opening of the HDPE pipe body, thereby creating a tight fit between the inner surface of the opening of the HDPE pipe body and the outer surface of the PVC insert.

In another example, the techniques of this disclosure may be realized as a process for joining a HDPE pipe to a PVC pipe. This process comprises receiving a pipe fitting that comprises a HDPE pipe body having a first circular opening and a second circular opening. The pipe fitting also comprises a ring-shaped PVC insert positioned within the first opening such that an outer surface of the PVC insert is in contact with an inner surface of the first opening. An inner surface of the PVC insert is threaded. In addition, the pipe fitting comprises a gapless compression ring installed over an outer surface of the HDPE pipe body at the first opening such that the compression ring exerts inward radial force on the HDPE pipe body, compressing the HDPE pipe body inward such that the inner surface of the first opening of the HDPE pipe body exerts inward radial force on the outer surface of the PVC insert, thereby creating a tight fit between the HDPE pipe body and the PVC insert. The process also comprises attaching the HDPE pipe to the second opening of the HDPE pipe body of the pipe fitting. In addition, the process comprises screwing the PVC pipe into the PVC insert of the pipe fitting.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An assembly comprising a pipe fitting, the pipe fitting comprising:
   a high-density polyethylene (HDPE) pipe body having a circular opening;
   a ring-shaped polyvinyl chloride (PVC) insert positioned within the opening such that an outer surface of the PVC insert is in contact with an inner surface of the opening of the HDPE pipe body, wherein an inner surface of the PVC insert is threaded; and
   a gapless compression ring installed over an outer surface of the HDPE pipe body at the opening of the HDPE pipe body, installation of the compression ring causing the compression ring to exert inward radial force on the HDPE pipe body, the inward radial force on the HDPE pipe body compressing the HDPE pipe body inward such that the inner surface of the opening of the HDPE pipe body exerts inward radial force on the outer surface of the PVC insert, thereby creating a tight fit between the HDPE pipe body and the PVC insert.

2. The assembly of claim 1,
   wherein multiple annular barbs extend from the outer surface of the PVC insert, and
   wherein the inner surface of the opening of the HDPE pipe body deforms around the annular barbs during installation of the compression ring due to the inward radial force on the HDPE pipe body exerted by the compression ring, and
   wherein each of the annular barbs has an exterior edge that is perpendicular to the outer surface of the PVC insert and an interior edge that is at a non-right angle relative to the outer surface of the PVC insert.

3. The assembly of claim 1, wherein prior to installation of the compression ring over the outer surface of the HDPE pipe body, an outer diameter of the PVC insert is approximately equal to an inner diameter of the opening of the HDPE body.

4. The assembly of claim 1, wherein prior to installation of the compression ring over the outer surface of the HDPE pipe body, an inner diameter of the compression ring is less than an outer diameter of outer surface of the HDPE pipe body.

5. The assembly of claim 4, wherein the inner diameter of the compression ring after installation of the compression ring is substantially the same as the inner diameter of the compression ring prior to installation of the compression ring.

6. The assembly of claim 1, wherein the compression ring is made of stainless steel.

7. The assembly of claim 1, wherein the HDPE pipe body is a tee fitting.

8. The assembly of claim 1, further comprising a PVC pipe screwed into the PVC insert.

* * * * *